United States Patent
Xiang et al.

(10) Patent No.: US 12,038,936 B2
(45) Date of Patent: Jul. 16, 2024

(54) METHOD AND APPARATUS FOR GENERATING DATA FEATURE, ELECTRONIC DEVICE AND COMPUTER READABLE MEDIUM

(71) Applicants: Beijing Wodong Tianjun Information Technology Co., Ltd., Beijing (CN); Beijing Jingdong Century Trading Co., Ltd., Beijing (CN)

(72) Inventors: Biao Xiang, Beijing (CN); Ai Han, Beijing (CN)

(73) Assignees: Beijing Wodong Tianjun information Technology Co. Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 0 days.

(21) Appl. No.: 18/246,041

(22) PCT Filed: Jun. 23, 2021

(86) PCT No.: PCT/CN2021/101703
§ 371 (c)(1),
(2) Date: Mar. 21, 2023

(87) PCT Pub. No.: WO2022/095463
PCT Pub. Date: May 12, 2022

(65) Prior Publication Data
US 2023/0359637 A1  Nov. 9, 2023

(30) Foreign Application Priority Data
Nov. 4, 2020 (CN) .......................... 202011215827.6

(51) Int. Cl.
G06F 16/24 (2019.01)
G06F 16/2458 (2019.01)

(52) U.S. Cl.
CPC ...... *G06F 16/2462* (2019.01); *G06F 16/2465* (2019.01); *G06F 16/2474* (2019.01); *G06F 2216/03* (2013.01)

(58) Field of Classification Search
None
See application file for complete search history.

(56) References Cited

U.S. PATENT DOCUMENTS 9,672,257 B2    6/2017  Tobin et al.
2005/0049913 A1  3/2005  Huddleston et al.
(Continued)

FOREIGN PATENT DOCUMENTS

CN    104516894 A    4/2015
CN    110618983 A    12/2019
(Continued)

OTHER PUBLICATIONS

International Search Report from PCT/CN2021/101703 mailed Sep. 24, 2021, 4 pages.

*Primary Examiner* — Son T Hoang
(74) *Attorney, Agent, or Firm* — Dinsmore & Shohl LLP

(57) ABSTRACT

A particular embodiment includes issuing a feature configuration template, such that a user configures, on a configuration interface, the content of the feature configuration template; receiving configuration content configured by the user for the feature configuration template and at least one set of time sequence data to generate at least one set of data feature values.

10 Claims, 5 Drawing Sheets

(56) References Cited

U.S. PATENT DOCUMENTS

| | | |
|---|---|---|
| 2015/0095381 A1 | 4/2015 | Chen et al. |
| 2016/0239756 A1* | 8/2016 | Aggour ............. G06F 16/24568 |
| 2016/0275122 A1* | 9/2016 | Kara ..................... G06F 16/248 |
| 2016/0357828 A1 | 12/2016 | Tobin et al. |
| 2017/0337159 A1 | 11/2017 | Hiraishi et al. |
| 2018/0137093 A1* | 5/2018 | Goldfarb ................. G06F 16/24 |
| 2019/0034489 A1* | 1/2019 | Ziegler ............... G06F 16/2455 |
| 2020/0401938 A1* | 12/2020 | Etkin ...................... G06F 16/24 |

FOREIGN PATENT DOCUMENTS

| | | |
|---|---|---|
| CN | 111241151 A | 6/2020 |
| CN | 111835628 A | 10/2020 |
| CN | 111858706 A | 10/2020 |
| RU | 2700401 C1 | 9/2019 |

\* cited by examiner

METHOD AND APPARATUS FOR GENERATING DATA FEATURE, ELECTRONIC DEVICE AND COMPUTER READABLE MEDIUM

CROSS-REFERENCE TO RELATED APPLICATIONS

This patent application is a national stage of International Application No. PCT/CN2021/101703, filed on Jun. 23, 2021, which claims priority to Chinese Patent Application No. 202011215827.6 filed on Nov. 4, 2020. Both of the aforementioned applications are hereby incorporated by reference in their respective entireties.

TECHNICAL FIELD

The present disclosure relates to the field of computer technology, in particular to the technical field of artificial intelligence, and more particularly to a method and apparatus for generating a data feature, an electronic device and a computer readable medium.

BACKGROUND

In data mining and application, the use of machine learning methods to solve problems becomes very effective and popular. Typically, a large portion of data analyzed and mined using machine learning is temporal sequential data, i.e., time series data. Time series data refers to a sequence of data sorted in chronological order, and such data reflects the state or degree of change of a certain object, phenomenon, etc. over time. Time series data is widely available in production and life, in fields such as economics, or weather forecasting. Time series data includes, for example, gross domestic product, consumer price index, daily broad market index, store∥s daily marketing volume, store∥s daily order volume, daily sales volumes of goods, etc.

In various features designed for analyzing time series data using machine learning, there are a variety of operational methods involved, for example, calculating statistics such as mean, extreme, variance, or mode of sample processing data in past set number of days. Configuration contents corresponding to the above different operations are difficult to be unified. Therefore, configurators need to face a variety of configuration forms and contents, and accurately understand the exact meaning of different parameters, in order to use the parameters correctly, the experience in this regard is poor.

SUMMARY

Embodiments of the present disclosure propose a method and apparatus for generating a data feature, an electronic device and a computer readable medium.

According to a first aspect, some embodiments of the present disclosure provide a method for generating a data feature. The method includes: issuing a feature configuration template, so that a user configures, on a configuration interface, content of the feature configuration template; receiving configuration content configured by the user for the feature configuration template and at least one set of time series data corresponding to the configuration content; and processing the at least one set of time series data based on the configuration content, to generate at least one set of data feature values.

According to a second aspect, some embodiments of the present disclosure provide apparatus for generating a data feature. The apparatus comprise: an issuing unit, configured to issue a feature configuration template, so that a user configures, on a configuration interface, content of the feature configuration template; a configuration receiving unit, configured to receive configuration content configured by the user for the feature configuration template; a data receiving unit, configured to receive at least one set of time series data corresponding to the configuration content; and a generation unit, configured to process the at least one set of time series data based on the configuration content, to generate at least one set of data feature values.

According to a third aspect, some embodiments of the present disclosure provide an electronic device, the electronic device includes: one or more processors; a storage apparatus, storing one or more programs thereon; and the one or more programs, when executed by the one or more processors, cause the one or more processors to implement the method according to any one of the implementations described in the first aspect.

According to a fourth aspect, some embodiments of the present disclosure provide a computer readable medium, storing a computer program thereon, wherein, the program, when executed by a processor, implements the method according to any one of the implementations described in the first aspect.

BRIEF DESCRIPTION OF THE DRAWINGS

Other features, objectives and advantages of the present disclosure will become more apparent from reading detailed description of non-limiting embodiments made with reference to the following accompanying drawings.

DETAILED DESCRIPTION OF EMBODIMENTS

Embodiments of the present disclosure will be further described in detail below with reference to the accompanying drawings. It may be understood that the embodiments described herein are only used to explain the related disclosure, but not to limit the disclosure. In addition, it should also be noted that, for ease of description, only parts related to the relevant disclosure are shown in the accompanying drawings.

It should be noted that embodiments in the present disclosure and features in the embodiments may be combined with each other on a non-conflict basis. Embodiments of the present disclosure will be described below in detail with reference to the accompanying drawings.

Figure 1:
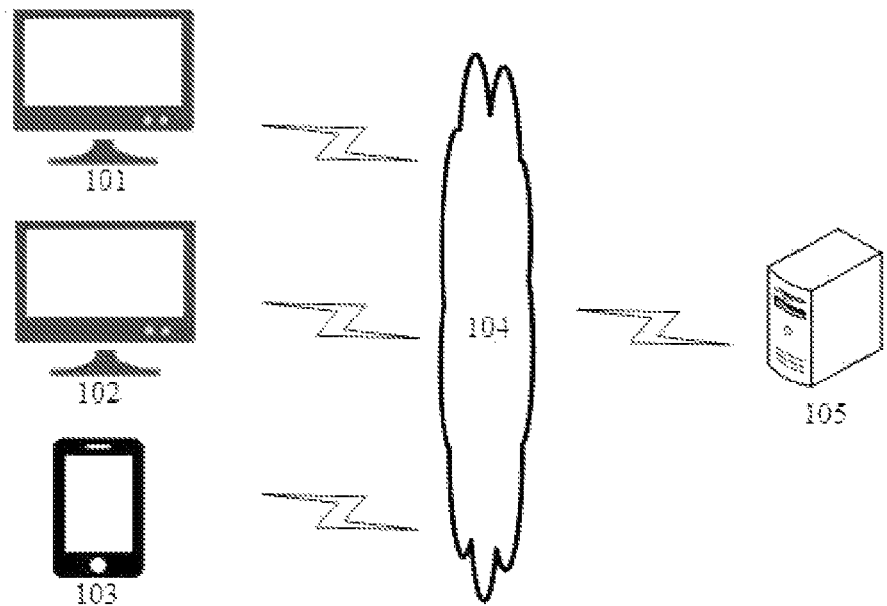
FIG. 1 is an example system architecture to which an embodiment of the present disclosure may be applied.

FIG. 1 illustrates an example system architecture 100 to which a method for generating a data feature of the present disclosure may be applied.

As shown in FIG. 1, the system architecture 100 may include terminal device(s) 101, 102, 103, a network 104, and a server 105. The network 104 serves as a medium providing a communication link between the terminal device(s) 101, 102, 103 and the server 105. The network 104 may include various types of connections, and may typically include such as wireless communication links.

The terminal device(s) 101, 102, 103 may interact with the server 105 via the network 104 to receive or send messages, etc. The terminal device(s) 101, 102, 103 may have various communication client applications installed thereon, such as instant messaging tools, email clients, or configuration interfaces.

The terminal device(s) 101, 102, 103 may be hardware or software. When the terminal device(s) 101, 102, 103 are hardware, they may be user devices having communication and control functions, and the user devices may communicate with the server 105. When the terminal device(s) 101, 102, 103 are software, they may be installed in the user devices; the terminal device(s) 101, 102, 103 may be implemented as multiple software or software modules (e.g., software or software modules for providing distributed services), or as a single software or software module, which is not limited herein.

The server 105 may be a server that provides various services, for example, a backend server for generating a data feature that provides support for a configuration interface on the terminal device(s) 101, 102, 103. The backend server may analyze and process information related to feature configuration templates of users in the network and feed processing results (e.g., generated data feature values) back to the terminal device(s).

It should be noted that the server may be hardware or software. When the server is hardware, it may be implemented as a distributed server cluster composed of a plurality of servers, or as a single server. When the server is software, it may be implemented as a plurality of software or software modules (e.g., software or software modules for providing distributed services), or as a single software or software module, which is not limited herein.

It should be noted that the method for generating a data feature provided by embodiments of the present disclosure is generally performed by the server 105.

It should be understood that the number of terminal devices, networks, and servers in FIG. 1 is merely illustrative. Depending on the implementation needs, there may be any number of terminal devices, networks, and servers.

Figure 2:
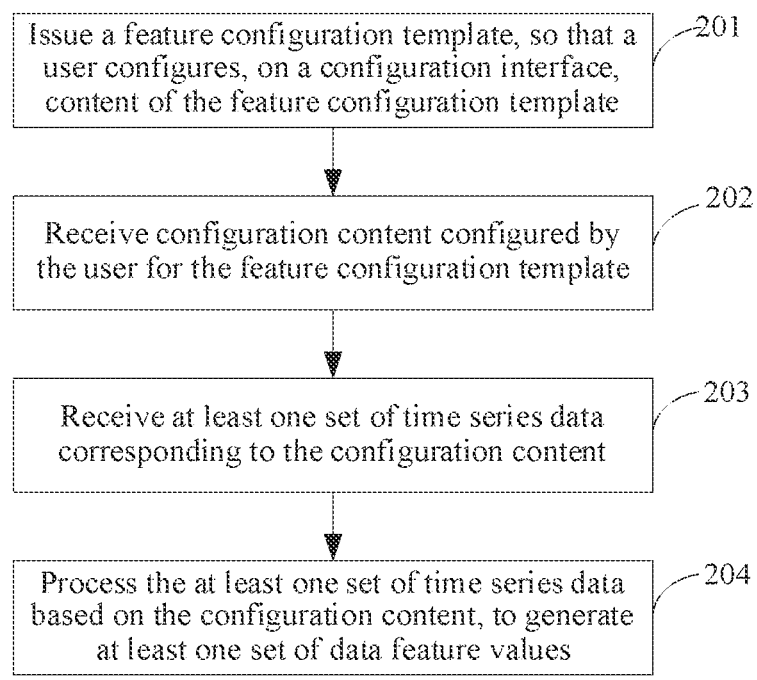
FIG. 2 is a flowchart of a method for generating a data feature according to an embodiment of the present disclosure.

The method for generating a data feature provided by an embodiment herein is used to generate various feature data involved in time series data using machine learning, for example, finding statistics such as mean, extreme, variance, or mode of the time series data over a period of time as data feature values. As shown in FIG. 2, illustrating a flow 200 of the method for generating a data feature according to an embodiment of the present disclosure, and the method for generating a data feature includes the following steps:

Step 201, issuing a feature configuration template, so that a user configures, on a configuration interface, content of the feature configuration template.

In this embodiment, the configuration interface is a user interface for data interaction between an executing body, on which the method for generating a data feature runs, and a user, the user configuration interface may be a preset interface compatible with the feature configuration template, for displaying the feature configuration template, and the executing body may receive configuration content for the feature configuration template configured by the user from the configuration interface.

In this embodiment, the feature configuration template may include one or more sequentially arranged feature sets, which are results refined from feature engineering for a large number of time series data regression algorithm tasks. The above feature sets may be abstracted into two feature set types: one is a window type; the other is a transformation type. By configuring a window feature set of the window type by the user, processing of historical data features, current date data features, and future data features of elements in the time series data may be completed conveniently.

Content contained in the window feature set may be set according to needs of the user. In some alternative implementations of this embodiment, the feature configuration template may include at least one window feature set, and the window feature set includes: a data element, a windowing parameter, and a statistics type. Further, the window feature set that does not have a scene element may be referred to as a window sub-feature set.

However, in some other alternative implementations of this embodiment, the feature configuration template may include at least one window feature set, and the window feature set includes: a data element, a windowing parameter, a scene element, and a statistics type. Further, the window feature set that has a scene element may be referred to as a scene sub-feature set.

In some alternative implementations of this embodiment, the feature configuration template may include at least two window feature sets. Here, a part of the at least two window feature sets is a window sub-feature set, and another part of the at least two window feature sets is a scene sub-feature set. Of course, in practice, all window feature sets in the at least two window feature sets may also be the above window sub-feature sets or the above scene sub-feature sets.

In this embodiment, the data element is a type to which the time series data belongs, and is also a type of data that needs to be defined or processed by the user, e.g., goods prices, goods sales volume, and goods promotion volume commonly used in sales volume forecasting. Names in the data element correspond to respective sets of time series data provided by the user, and the names in the data element may also determine a set of time series data by containing multiple descriptive fields.

In this embodiment, the windowing parameter includes: a windowing direction, a windowing size, and a windowing datum point. The windowing direction refers to whether a window is opened towards to future time or towards to historical time when selecting eligible time series data.

The windowing size refers to a selection range when selecting eligible time series data. Suppose the current date is 2020 Jan. 1, when the windowing size is 3, 3 days adjacent to 2020 Jan. 1 may be selected, when the window is opened towards to historical time, the selected time may be 2019 Dec. 29, 2019 Dec. 30, and 2019 Dec. 31; or when the window is opened towards to future time, the selected time may be 2020 Jan. 1, 2020 Jan. 2, and 2020 Jan. 3.

The windowing datum point is a point in time, the time series data at the windowing datum point is used as a starting point, a window is opened from the time series data at the windowing datum point towards to future time or historical time to select eligible time series data. For example, the windowing datum point corresponding to sample observation is 2020 Jan. 1, then reference data that needs to be selected is 2020 Jan. 1 and data generated in the future, and features containing information about the current date and the future may be generated. As another example, time corresponding to the sample observation is 2020 Jan. 1, then reference data that needs to be selected is data generated before 2020 Jan. 1, and features containing information about yesterday and earlier historical information may be generated. Windowing processing on the time series data may be performed conveniently and quickly by using the configuration value for the windowing parameter.

In this embodiment, the statistics type is what kind of statistical calculation is done for multiple pieces of data within the time range of a window. For example, the statistical calculation may include: finding the mean, maximum, variance, median, and/or sum, etc. The statistical calculation may also be further extended to finding a first value, a last value, or other custom statistical operations.

In this embodiment, the scene element refers to a scene condition that needs to be defined. For example, based on the condition that what day of the week the current date of corresponding time of the sample is, statistical values of historical sales volume corresponding to the same day of the week in history are calculated by using time series data of goods sales volume. That is, data dates selected in the range of a window all belonging to the same day of the week are calculated, and this specified day of the week is a kind of scene condition, similar scene conditions may also be whether there is a promotion, whether it is a weekend, and/or a holiday, etc.

Figure 4:
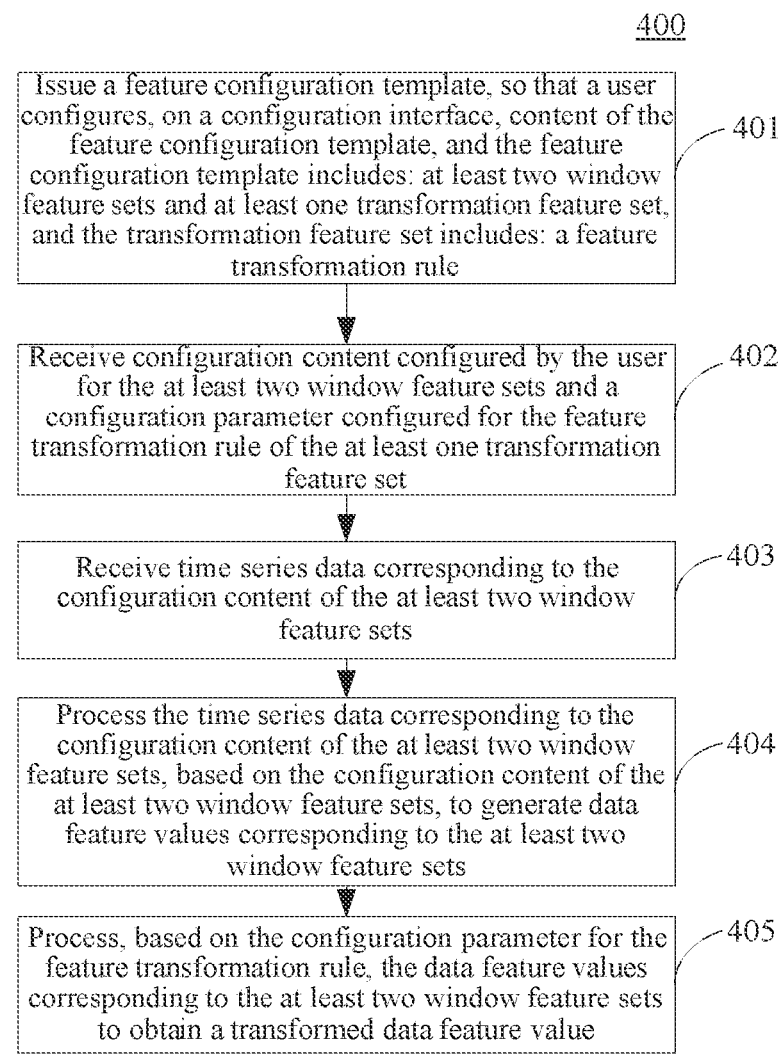
FIG. 4 is a flowchart of the method for generating a data feature according to a third embodiment of the present disclosure.

In order to realize combination of data feature values generated by multiple window feature sets to obtain different or more data feature values, the feature configuration template may also include at least one transformation feature set, referring to the embodiment shown in FIG. 4.

Step 202, receiving configuration content configured by the user for the feature configuration template.

In this embodiment, based on differences in the definitions of attributes in the feature set of the feature configuration template, the configuration contents that need to be configured by the user for the attributes are different from each other.

In this embodiment, when the window feature set in the feature configuration template includes: a data element, a windowing parameter, and a statistics type, the receiving configuration content configured by the user for the feature configuration template, includes: receiving a configuration parameter for the data element, a configuration parameter for the statistics type, and a configuration value for the windowing parameter, the configuration parameters and the configuration value are configured by the user.

Alternatively, when the window feature set in the feature configuration template includes: a data element, a windowing parameter, a scene element, and a statistics type, the receiving configuration content configured by the user for the feature configuration template, includes: receiving a configuration parameter for the data element, a configuration parameter for the statistics type, a configuration value for the windowing parameter, and a configuration value for the scene element, configured by the user.

Table 1 is a configuration content in which the user configures each configuration parameter in the feature configuration template. Description information may be provided in the feature configuration template, and the description information is used to help the user understand meaning of the features, such as DESC in Table 1, which is used to describe that the current configuration is to perform various statistics on time series data of historical sales volumes, that is, "performing statistics on historical sales volumes".

The feature configuration template also has a configuration parameter for whether a feature set is to be activated or not, and only an activated feature set may be used in a data processing session. For example, the ENABLED in Table 1, whose value may be True (activate), or False (inactivate), and only activated feature configuration may be used in the data processing session. This attribute allows for flexible switching of a feature set, facilitating program problem location and effect comparison testing.

The feature configuration template also has a configuration parameter for whether a feature set uses a scene element, such as OPERATOR in Table 1, whose configuration value may be GENERAL_WINDOW, or SCENE_WINDOW. GENERAL_WINDOW: windowing operation performed based on time series data of the data element. SCENE_WINDOW: windowing operation performed on time series data of the scene element based on the scene condition specified by the scene element.

In Table 1, FUTURE_MODE refers to the windowing direction, and its configuration value may be True (window opened towards to future time) or False (window opened towards to historical time).

In Table 1, ONGOING_MODE refers to the window datum point, ONGOING_MODE only makes sense when OPERATOR is SCENE_WINDOW, indicating whether to consider processing scene information of the feature on the current date, whose value may be True (using scene correlation, such as obtaining statistics corresponding to the same day of the week/a certain marketing tool), or False (not using scene correlation, such as not caring about what day of the week the current date is, obtaining statistics corresponding to each day of the week/all marketing tools).

In Table 1, WINDOW__V refers to the windowing size and represents a length of time for multiple selection ranges.

In Table 1, MIN_PERIODS refers to the minimum number of actual records that must be contained in a time range selected by the window, in this embodiment, it may also be determined whether to process at least one set of time series data based on value of MIN_PERIODS. For example, when the selected time range is the three days of 2019 Dec. 29, 2019 Dec. 30, and 2019 Dec. 31, and only the data of 2019 Dec. 31 is recorded in the time series data, if the MIN_PERIODS is configured as being greater than 1, then the window is invalid and no data feature values are generated.

In Table 1, TRANSFORMING refers to the statistics type, and the statistics type refers to what kind of statistical calculation is done for multiple pieces of data within the window time range.

In Table 1, DATA_ELEMENT refers to the data element, i.e., on which data variable the statistical calculation of the current feature set is performed, and names in the data element may also be capable of determining a set of time series data by means of containing multiple descriptive fields. In Table 1, the data element corresponds to a set of time series data, in which the time series data is stored in three fields "sale_quality", "daily", and "sku_id".

In Table 1, SCENE_ELEMEMT refers to the scene element. In Table 1, the scene element makes sense when and only when OPERATOR is SCENE_WINDOW. Specific scenes under the scene element are traversed to perform calculation on a DATA_ELEMETN that meet the scene condition.

In Table 1, FEATURE_NAME refers to a name of the feature generated by processing. When not specified by the user, the executing body of the method for generating a data feature uses a system default feature name generated by the system based on the statistics type; if the user configures a specified name, the name specified by the user is used.

TABLE 1

| Attribute | Configuration content | Description |
| --- | --- | --- |
| DESC | 〖Performing statistics on historical sales volumes〗 | |
| ENABLED | True | True or False |
| OPERATOR | GENERAL_WINDOW | GENERAL_WINDOW or SCENE_WINDOW |
| FUTURE_MODE | True | True or False |
| ONGOING_MODE | True | True or False |
| WINDOW_V | [7, 14, 30] | |
| MIN_PERIODS | [2] | |
| TRANSFORMING | [〖MEAN〗, 〖MAX〗] | MEAN: finding the mean, MAX: finding the maximum |
| DATA_ELEMENT | [ (〖sale_quality〗〖daily〗〖sku_id〗) ] | |
| SCENE_ELEMEMT | [ ] | |
| FEATURE_NAME | [ ] | |

Step 203, receiving at least one set of time series data corresponding to the configuration content.

In this embodiment, the time series data refers to a sequence of data sorted in chronological order, and such data reflects the state or degree of change of a certain object, phenomenon, etc. over time.

In this embodiment, when there are multiple window feature sets, for different or the identical window feature sets, the receiving at least one set of time series data corresponding to the configuration content includes: receiving at least one set of time series data corresponding to the configuration parameter for the data element.

In this embodiment, the at least one set of time series data may be stored in a database by the user in the form of a table(s). Since the at least one set of time series data corresponds to the data element configured by the user, the data element corresponds to a table header of the at least one set of data stored in the form of a table.

In this embodiment, the executing body, on which the method for generating a data feature runs, may read the at least one set of time series data by determining a storage location of the at least one set of time series data through communication with the user or through an acquisition method specified by the user.

Step 204, processing the at least one set of time series data based on the configuration content, to generate at least one set of data feature values.

In this embodiment, the data feature values are feature values that can be used in machine learning obtained based on the time series data, and the data feature values have features of the data as well as time series features.

For the time series data, if it is needed to construct two or more samples at different points in time (e.g., 2020 Jan. 1, 2020 Jan. 2) for the same observation object (e.g., certain goods 1, 2, 3), usually, it is possible to slide the recording time forward or backward uniformly for a certain time interval. Since records of the same observation object at the different points in time are generated by repeating the previous step after using time sliding, all samples finally generated are progressively stacked in a direction of rows of all observation objects. A final constructed form of the samples is shown in Table 2, where goods 1, goods 2, and goods 3 corresponding to Goods name are the observation objects, Sales date is sample time, and Today's sales volume, Yesterday's sales volume and historical 7-day mean are the data feature value.

TABLE 2

| Goods name | Sales date | Today's sales volume | Yesterday's sales volume | Historical 7-day mean |
| --- | --- | --- | --- | --- |
| Goods 1 | 2020 Jan. 1 | 10 | 8 | 12 |
| Goods 2 | 2020 Jan. 1 | 15 | 10 | 13.5 |
| Goods 3 | 2020 Jan. 1 | 5 | 15 | 12 |
| Goods 1 | 2020 Jan. 2 | 20 | 28 | 22 |
| Goods 2 | 2020 Jan. 2 | 25 | 20 | 23.5 |
| Goods 3 | 2020 Jan. 2 | 25 | 25 | 22 |

In some alternative implementations of this embodiment, when the feature configuration template includes a window feature set, and the window feature set includes: a data element, a windowing parameter, and a statistics type, the processing the at least one set of time series data based on the configuration content to generate at least one set of data feature values, includes: processing the at least one set of time series data based on the configuration value for the windowing parameter, to generate at least one data matrix; and processing the at least one data matrix based on the configuration parameter for the statistics type, to generate the at least one set of data feature values.

In this alternative implementation, the windowing parameter may reflect a time period of the time series data to be intercepted, and the data matrix obtained by processing the at least one set of time series data may be a data matrix obtained by selecting all time series data, or a data matrix obtained by selecting time series data in a certain time period in the at least one set of time series data, or a data matrix obtained by selecting time series data that meets the scene condition (e.g., Wednesday of each week) in the at least one set of time series data.

In this alternative implementation, since the statistics type may reflect statistical methods used for at least one set of time sequence features, such as statistical methods including: finding the mean, extreme, variance, mode, etc., the obtained at least one set of data feature values may reflect features of the time series data obtained by performing calculation using the above statistical methods on the tine series data.

In this alternative implementation, first processing the at least one set of time series data based on the configuration value for the windowing parameter to generate at least one data matrix; and then processing the at least one data matrix based on the configuration parameter for the statistics type to generate the at least one set of data feature values. Thus, for the common window feature set that does not have a scene element, the time series data is processed in the form of a data matrix. This personalized feature processing method based on data matrix improves the reliability of processing time series data and simplifies data processing steps.

Further, in some alternative implementations of this embodiment, for the window feature set that does not have a scene element, the generated data matrix needs to refer to only the configuration value for the windowing parameter. The method for processing the at least one set of time series data based on the configuration value for the windowing parameter, to generate at least one data matrix includes: performing windowing processing on the at least one set of time series data based on the configuration value for the windowing parameter, to generate the at least one data matrix.

In this alternative implementation, the performing windowing processing on the at least one set of time series data based on the configuration value for the windowing parameter, includes: selecting, in the at least one set of time series data, an element indicated by the data element (determining data in a row direction of the data matrix), and selecting, in the at least one set of time series data, recorded data indicated by the configuration value for the windowing parameter corresponding to a selection range of the selected element (determining data in a column direction of the data matrix), to obtain a data matrix having row values and column values.

In this alternative implementation, for the window feature set that does not have a scene element, i.e., the common window feature set, windowing processing is performed on the time series data with reference to the configuration value for the windowing parameter only, to generate the data matrix. The data processing is simple in structure and easy to implement.

Further, in some alternative implementations of this embodiment, for the window feature set that has a scene element, the generated data matrix needs to refer to both the scene element and the configuration content of the windowing parameter. The method for processing the at least one set of time series data based on the configuration value for the windowing parameter to generate at least one data matrix includes:

performing windowing processing on the at least one set of time series data based on the configuration value for the windowing parameter, to generate at least one window matrix; performing scene-based processing on the at least one window matrix based on the configuration value for the scene element, to obtain at least one scene matrix corresponding to the at least one window matrix; and calculating a dot product of the at least one window matrix and the at least one scene matrix to generate the at least one data matrix.

In this alternative implementation, unlike the generation of a data matrix based on the data element in the window feature set without a scene element, it may first perform windowing processing to obtain the window matrix, then perform scene-based processing on the window matrix to obtain the scene matrix, and determining a dot product of the window matrix and the corresponding scene matrix to obtain the data matrix.

In this alternative implementation, performing windowing processing on the at least one set of time series data based on the configuration value for the windowing parameter, to obtain a window matrix includes: selecting an element indicated by the data element of the window feature set in the at least one set of time series data (determining an element in the row direction of the window matrix) and selecting recorded data indicated by the configuration value for the windowing parameter corresponding to a selection range of the selected element in the at least one set of time series data (determining data in the column direction of the window matrix), to obtain a window matrix.

In this alternative implementation, performing scene-based processing on the at least one window matrix to obtain a scene matrix includes: searching the window matrix for all scene values based on the scene element, and generating a record value that is or is not a scene value for a certain scene in which each piece of data of the window matrix is located. Rows of the scene matrix are aligned with those of the window matrix, while record values in the columns are 0 or 1, with 0 or 1 indicating whether it belongs to the certain scene (0 indicates not belonging to the certain scene corresponding to the scene value, and 1 indicates belonging to the certain scene corresponding to the scene value).

In this alternative implementation, for the window feature set that has a scene element, the window matrix generated based on the configuration value for the windowing parameter is dot multiplied with the scene matrix generated based on the configuration value for the scene element, to generate the data matrix, so that the obtained data matrix is fully characterized by the configuration value for the scene element and fully meets the user's needs for scene-based processing.

In this embodiment, the method for windowing processing is related to configuration content of the windowing parameter. Alternatively, the windowing parameter includes: start data for the windowing, and/or end data for the windowing, and the performing windowing processing on the at least one set of time series data includes: intercepting, in the at least one set of time series data, the start data for the windowing and the end data for the windowing configured in the windowing parameter by the user, to generate the at least one window matrix.

In some alternative implementations of this embodiment, the windowing parameter includes: a windowing direction, a windowing size, and a windowing datum point; and the performing windowing processing on the at least one set of time series data based on the configuration value for the windowing parameter to generate at least one window matrix, includes: determining, based on a configuration value for the datum point, a current observation time point of the at least one set of time series data; and in each set of time series data of the at least one set of time series data, selecting, starting from the current observation time point and in a direction indicated by a configuration value for the windowing direction, time series data indicated by a configuration value for the windowing size to obtain the at least one window matrix.

In this alternative implementation, the configuration values for the windowing datum point, the windowing direction, and the windowing size are all obtained from user configuration. Of course, the windowing datum point may also be a default current date.

The method for generating at least one window matrix provided by this alternative implementation performs data interception on the at least one set of time series data based on the configuration values for the windowing direction, the windowing size, and the windowing datum point configured by the user to obtain an accurate window matrix, which improves a processing effect for the time series data and ensures an accuracy of the generated data feature values.

The method for generating a data feature provided by embodiments of the present disclosure, first issuing a feature configuration template; receiving configuration content configured by the user for the feature configuration template and at least one set of time series data corresponding to the configuration content; and processing the at least one set of time series data based on the configuration content to generate at least one set of data feature values. As a result, personalized feature processing on the time series data is realized by using a highly versatile, concise and consistent feature configuration template, which may simplify daily data development for machine learning, effectively support personalization of data mining, improve the convenience of operations of the user for generating feature values, and reduce a learning cost and a maintenance cost of the user.

Figure 3:
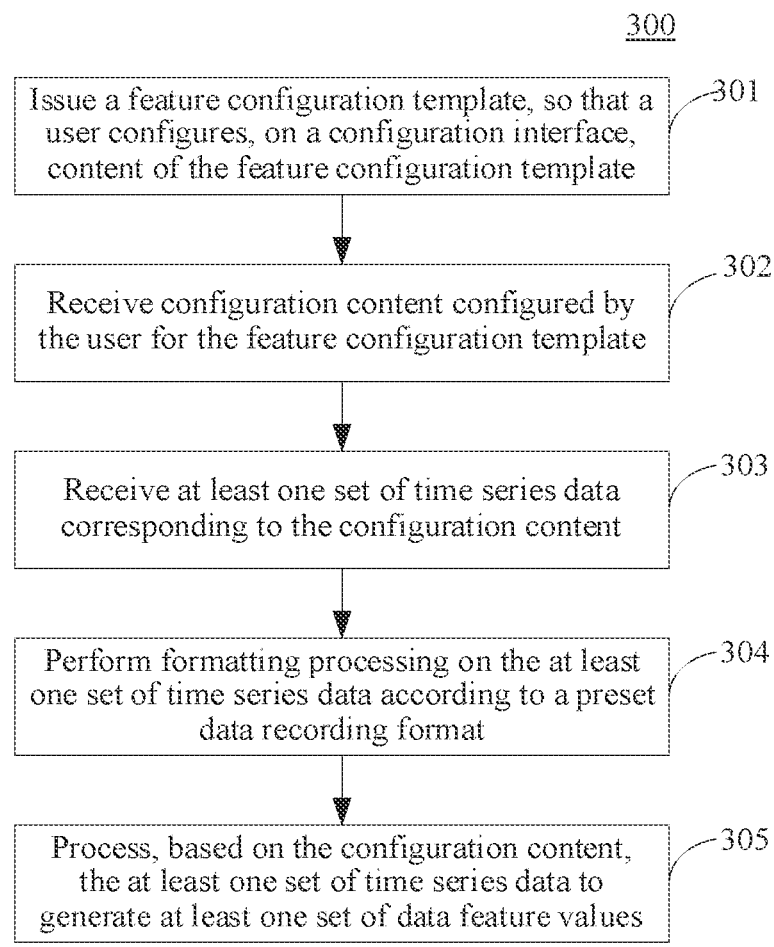
FIG. 3 is a flowchart of the method for generating a data feature according to another embodiment of the present disclosure.

In order that the generated data feature values more accurately reflect features of the time series data, further referring to FIG. 3, which illustrates a flow 300 of the method for generating a data feature according to another embodiment of the present disclosure. The method for generating a data feature includes the following steps:

Step 301, issuing a feature configuration template, such that a user configures, on a configuration interface, content of the feature configuration template.

Step 302, receiving configuration content configured by the user for the feature configuration template.

Step 303, receiving at least one set of time series data corresponding to the configuration content.

It should be understood that operations and features in the above steps 301-303 correspond to the operations and features in steps 201-203, respectively, therefore, the above description of the operations and features in steps 201-203 is equally applicable to steps 301-303, and detailed description thereof will be omitted.

Step 304, performing formatting processing on the at least one set of time series data according to a preset data recording format.

In this embodiment, before performing formatting processing on the at least one set of time series data, data cleaning may also be first performed on the at least one set of time series data, and the data cleaning includes: data filling or data removal. Data removal refers to removal of obvious invalid data in the time series data, and data filling refers to filling of vacant data in the time series data with data of fixed format, such as mean, 0, null.

In this embodiment, each row of the preset data recording format represents record values (such as 10, 15, 5 in Table 3) of a certain attribute (such as the sales volumes in Table 3) of an observation object (such as goods 1 in Table 3) at different points in time (such as 2020 Jan. 1, 2020 Jan. 2, 2020 Jan. 3 in Table 3), and each column represents a time point, or there will be multiple columns if there are multiple record values at multiple time points. At the same time, for each row, the observations are aligned in time, as follows: reading a historical data length and a future forecast date that need to be used from the configuration content configured by the user for the feature configuration template, and calculating the earliest historical data time and the latest future time based on the current date (for example, the current time is 2020 Jan. 1, a configured history record is 31 days, and the future forecast is 7 days, then the earliest historical time is 2019 Dec. 1, and the latest future time is 2020 Jan. 8). Then, each row of records is supplemented with the record value at a missing time. When supplementing the record value, it is necessary to decide what value to fill according to a usage scenario and a nature of the attribute of the record value, such as filling with a value of the last date, or filling with the mean, 0 or null.

TABLE 3

| Goods name | Data element | 2020 Jan. 1 | 2020 Jan. 2 | 2020 Jan. 3 |
|---|---|---|---|---|
| Goods 1 | Sales volume (pieces) | 10 | 15 | 5 |
| Goods 1 | Sales unit-price (yuan) | 9.9 | 9 | 11 |
| Goods 1 | Sales amount (RMB) | 99 | 135 | 55 |

Step 305, processing the at least one set of time series data based on the configuration content, to generate at least one set of data feature values.

In this embodiment, since formatting processing is performed on the at least one set of time series data, and the at least one set of time series data is processed (e.g., performing windowing processing on the at least one set of time series data to obtain a data matrix; or windowing processing is performed on the at least one set of time series data to obtain a window matrix, then scene-based processing is performed on the window matrix to obtain a scene matrix, and the window matrix is dot multiplied with the scene matrix to obtain a data matrix), the processing effect for time series data of a fixed format is better.

The method for generating a data feature provided by this embodiment, after receiving at least one set of time series data corresponding to the configuration content, performs formatting processing on the at least one set of time series data according to the preset data recording format, so that the format of all time series data may be converted into a fixed data recording format, which facilitates subsequent performing uniform operation on the time series data, improving the convenience of processing the time series data.

Further, in another embodiment of the present disclosure, there are at least two window feature sets, and the feature configuration template includes: at least one transformation feature set, and each transformation feature set includes: a feature transformation rule, where the feature transformation rule is used to represent an arithmetic operational relationship between at least two data feature values that correspond one-to-one to the two window feature sets. With further reference to FIG. 4, illustrating a flow 400 of the method for generating a data feature according to a third embodiment of the present disclosure. The method for generating a data feature includes the following steps:

Step 401, issuing a feature configuration template, so that a user configures, on a configuration interface, content of the feature configuration template, and the feature configuration template includes: at least two window feature sets and at least one transformation feature set, and the transformation feature set includes: a feature transformation rule.

In this embodiment, by using the feature transformation rule in the transformation feature set, quadratic transformation, feature crossover, and other types of operations may be performed on the at least one or two data feature values, which are obtained by processing based on the configuration content of the at least two window feature sets, to form a different data feature value or to obtain more data feature values.

In this embodiment, the feature transformation rule may be an arithmetic operational rule between at least two data features, the feature transformation rule may be composed of existing data feature values and operators in a similar expression, e.g., a feature transformation rule is [("f1", "/", "f2"), ("f1", "*", "f1", "+", 1)], which means that two new features are generated, i.e., one of the transformed data feature values is f1 divided by f2, and the other is f1 multiplied by f1 plus 1.

Step 402, receiving configuration content configured by the user for the at least two window feature sets and a configuration parameter configured for the feature transformation rule of the at least one transformation feature set.

In this embodiment, the feature transformation rule needs to be configured by the user, that is, the above [("f1", "/", "f2"), ("f1", "*", "f1","+",1)] is obtained from user configuration.

Step 403, receiving time series data corresponding to the configuration content of the at least two window feature sets.

In this embodiment, the time series data corresponding to the configuration content of the at least two window feature sets may be a set of time series data or multiple sets of time series data.

Step 404, processing the time series data corresponding to the configuration content of the at least two window feature sets, based on the configuration content of the at least two window feature sets, to generate data feature values corresponding to the at least two window feature sets.

In this embodiment, after processing the time series data corresponding to the configuration content of the at least two window feature sets, there are at least two data feature values are generated, where part of the at least two data feature values correspond to part of window feature sets of the at least two window feature sets, and another part of the at least two data values correspond to another part of window feature sets of the at least two window feature sets.

In some alternative implementations of this embodiment, when the at least two window feature sets both include: data elements, windowing parameters, and statistics types, the processing, based on the configuration content, the time series data corresponding to the configuration content of the at least two window feature sets to generate data feature values corresponding to the at least two window feature sets, includes: processing, based on the configuration value for the windowing parameter, the time series data corresponding to the configuration content of the at least two window feature sets to generate a data matrix corresponding to the configuration content of the at least two window feature sets; and processing, based on the configuration parameter for the statistics type, the data matrix corresponding to the configuration content of the at least two window feature sets to generate the data feature values corresponding to the at least two window feature sets.

In some alternative implementations of this embodiment, for the window feature set that does not have a scene element in the at least two window feature sets, the generated data matrix only needs to refer to the configuration value for the windowing parameter, while the method for processing, based on the configuration value for the windowing parameter, the time series data corresponding to the configuration content of the at least two window feature sets to generate a data matrix corresponding to the configuration content of the at least two window feature sets includes: performing, based on the configuration value for the windowing parameter, windowing processing on the time series data corresponding to the configuration content of the at least two window feature sets, to generate the data matrix corresponding to the configuration content of the at least two window feature sets.

In some alternative implementations of this embodiment, for the window feature set that has a scene element in the at least two window feature sets, the generated data matrix needs to refer to both the scene element and the configuration content of the windowing parameter. The method for processing based on the configuration value for the windowing parameter, the time series data corresponding to the configuration content of the at least two window feature sets, to generate a data matrix corresponding to the configuration content of the at least two window feature sets, includes:

performing, based on the configuration value for the windowing parameter, windowing processing on the time series data corresponding to the configuration content of the at least two window feature sets, to generate a window matrix corresponding to the configuration content of the at least two window feature sets; performing, based on the configuration value for the scene element, scene-based processing on the window matrix corresponding to the configuration content of the at least two window feature sets, to obtain at least one scene matrix corresponding to the window matrix corresponding to the configuration content of the at least two window feature sets; and dot multiplying the window matrix corresponding to the configuration content of the at least two window feature sets with the corresponding scene matrix to generate the data matrix corresponding to the configuration content of the at least two window feature sets.

Step 405, processing, based on the configuration parameter for the feature transformation rule, the data feature values corresponding to the at least two window feature sets to obtain a transformed data feature value.

In this embodiment, the processing the data feature values corresponding to the at least two window feature sets based on the configuration parameter for the feature transformation rule refers to, data arithmetic operations are performed on the data feature values corresponding to the at least two window feature sets according to the feature transformation rule composed of user-configured parameters to obtain transformed data feature value(s).

The method for generating a data feature provided by this embodiment, for more than two window feature sets, uses the feature transformation rule of the at least one transformation feature set in the feature configuration template. The method may realize quadratic transformation, feature crossover and other types of operations on the corresponding data feature values of the more than two window feature sets, to combine different or more transformed data feature values, which improves the diversity of data feature generation.

Figure 5:
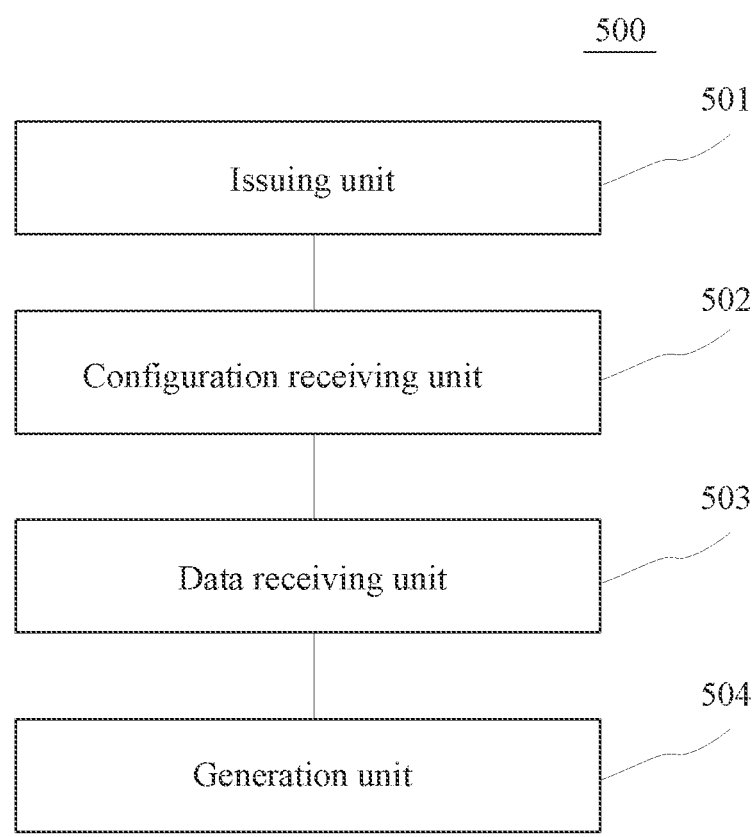
FIG. 5 is a schematic structural diagram of an apparatus for generating a data feature according to an embodiment of the present disclosure.

With further reference to FIG. 5, as an implementation of the method shown in the above figures, an embodiment of the present disclosure provides an apparatus for generating a data feature, and the embodiment of the apparatus corresponds to the embodiment of the method shown in FIG. 2. The apparatuses may be applied to various electronic devices.

As shown in FIG. 5, an embodiment of the present disclosure provides an apparatus 500 for generating a data feature, and the apparatus 500 includes: an issuing unit 501, a configuration receiving unit 502, a data receiving unit 503, and a generation unit 504. The issuing unit 501 may be configured to issue a feature configuration template, so that a user configures, on a configuration interface, content of the feature configuration template. The configuration receiving unit 502 may be configured to receive configuration content configured by the user for the feature configuration template. The data receiving unit 503 may be configured to receive at least one set of time series data corresponding to the configuration content. The generation unit 504 may be configured to process the at least one set of time series data based on the configuration content, to generate at least one set of data feature values.

In this embodiment, in the apparatus 500 for generating a data feature, for the specific processing and technical effects of the issuing unit 501, the configuration receiving unit 502, the data receiving unit 503, and the generation unit 504, reference may be made to step 201, step 202, step 203, step 204 corresponding to the embodiment of FIG. 2, respectively.

In some embodiments, the feature configuration template includes a window feature set, and the window feature set includes: a data element, a windowing parameter, and a statistics type; and the configuration receiving unit 502 includes: a configuration receiving module (not shown in the figure). The configuration receiving module may be configured to receive a configuration parameter for the data element, a configuration parameter for the statistics type, and a configuration value for the windowing parameter, configured by the user. The data receiving unit 503 may be further configured to receive at least one set of time series data corresponding to the configuration parameter for the data element. The generation unit 504 includes: a matrix generation module (not shown in the figure), and a feature generation module (not shown in the figure). The matrix generation module may be configured to process the at least one set of time series data based on the configuration value for the windowing parameter, to generate at least one data matrix. The feature generation module may be configured to process the at least one data matrix based on the configuration parameter for the statistics type, to generate the at least one set of data feature values.

In some embodiments, the matrix generation module may be further configured to perform windowing processing on the at least one set of time series data based on the configuration value for the windowing parameter, to generate the at least one data matrix.

In some embodiments, the window feature set further includes: a scene element; and the configuration receiving unit 502 further includes: a scene receiving module (not shown in the figure). The scene receiving module may be configured to receive a configuration value for the scene element configured by the user. The generation unit 504 includes: a window generation module (not shown in the figure), a scene generation module (not shown in the figure), and a multiplying generation module (not shown in the figure). The window generation module may be configured to perform windowing processing on the at least one set of time series data based on the configuration value for the windowing parameter, to generate at least one window matrix. The scene generation module may be configured to perform scene-based processing on the at least one window matrix based on the configuration value for the scene element, to obtain at least one scene matrix corresponding to the at least one window matrix. The multiplying generation module may be configured to determine a dot product of the at least one window matrix and the at least one scene matrix to generate the at least one data matrix.

In some embodiments, the windowing parameter includes: a windowing direction, a windowing size, and a windowing datum point; and the window generation module includes: a datum submodule (not shown in the figure) and a configuration submodule (not shown in the figure). The datum submodule may be configured to determine a current observation time point of the at least one set of time series data, based on a configuration value for the datum point. The configuration submodule may be configured to select, in each set of time series data of the at least one set of time series data, starting from the current observation time point and in a direction indicated by a configuration value for the windowing direction, time series data indicated by a configuration value for the windowing size starting to obtain the at least one window matrix.

In some embodiments, there are at least two window feature sets, and the feature configuration template further includes: at least one transformation feature set, and the transformation feature set includes: a feature transformation rule; the configuration receiving unit 502 further includes: a parameter receiving module (not shown in the figure). The parameter receiving module may be configured to receive a configuration parameter for the feature transformation rule configured by the user; and the apparatus 500 further includes: a transformation unit (not shown in the figure). The transformation unit may be configured to process, based on the configuration parameter for the feature transformation rule, data feature values corresponding to the at least two window feature sets, to obtain a transformed data feature value.

In some embodiments, the apparatus 500 further includes: a formatting unit (not shown in the figure). The formatting unit may be configured to perform formatting processing on the at least one set of time series data according to a preset data recording format.

The apparatus for generating a data feature provided by an embodiment of the present disclosure, first the issuing unit 501 issues a feature configuration template, such that a user configures, on a configuration interface, content of the feature configuration template; the configuration receiving unit 502 and the data receiving unit 503 respectively receive configuration content configured by the user for the feature configuration template and at least one set of time series data corresponding to the configuration content; and the generation unit 504 processes the at least one set of time series data based on the configuration content to generate at least one set of data feature values. As a result, personalized feature processing on the time series data is realized by using a highly versatile, concise and consistent feature configuration template, which may simplify daily data development for machine learning, effectively support personalization of data mining, improve the convenience of operations of the user for generating feature values, and reduce a learning cost and a maintenance cost of the user.

Figure 6:
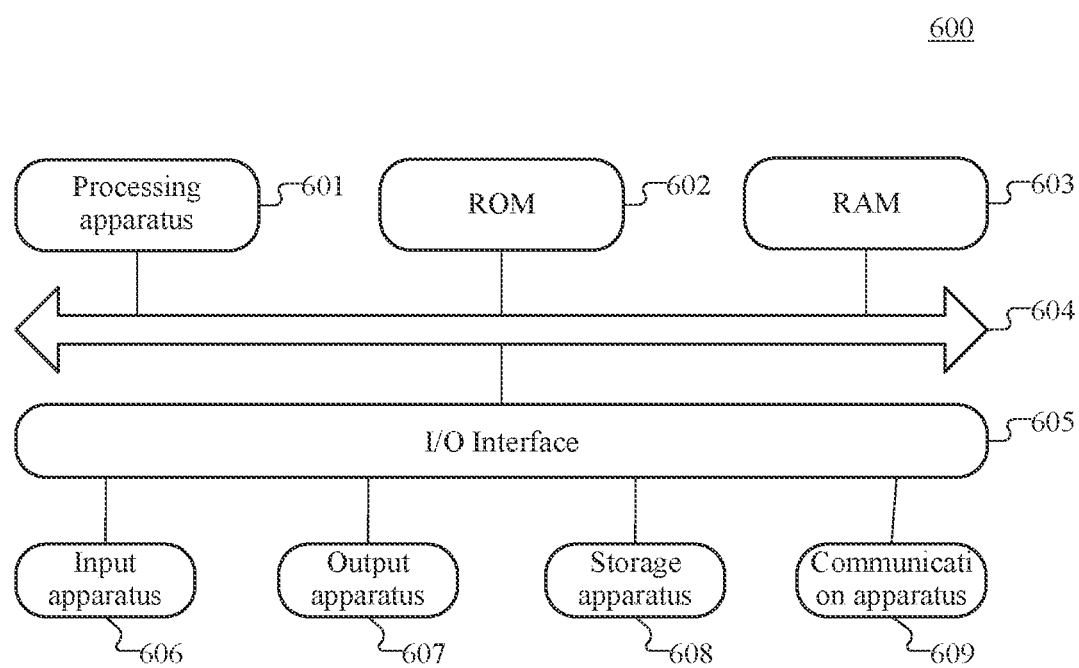
FIG. 6 is a schematic structural diagram of an electronic device suitable for implementing embodiments of the present disclosure.

Referring next to FIG. 6, illustrating a schematic structural diagram of an electronic device 600 suitable for implementing embodiments of the present disclosure.

As shown in FIG. 6, the electronic device 600 may include a processing apparatus (such as a central processing unit, a graphics processor) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Typically, the following apparatuses may be connected to the I/O interface 605: an input apparatus 606 including a touch screen, a touch pad, a keyboard, or a mouse; an output apparatus 607 including such as a liquid crystal display (LCD), a speaker, or a vibrator; the storage apparatus 608 including such as a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the illustrated apparatuses. It may alternatively be implemented or provided with more or fewer apparatuses. Each block shown in FIG. 6 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication apparatus 609, or may be installed from the storage apparatus 608, or may be installed from the ROM 602. The computer program, when executed by the processing apparatus 601, implements the above mentioned functionalities as defined by the methods of the present disclosure.

It should be noted that the computer readable medium in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the server, or a stand-alone computer readable medium not assembled into the server. The computer readable medium carries one or more programs, the one or more programs, when executed by the server, cause the server to: issue a feature configuration template to a user-configured interface; receive configuration content configured by the user for the feature configuration template and at least one set of time series data corresponding to the configuration content; and process the at least one set of time series data based on the configuration content to generate at least one set of data feature values.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described unit may also be provided in a processor, for example, it may be described as: a processor including an issuing unit, a configuration receiving unit, a data receiving unit, and a generation unit. Here, the names of these units do not in some cases constitute a limitation to such units themselves. For example, the issuing unit may alternatively be described as ‖ a unit configured to issue a feature configuration template, such that a user configures, on a configuration interface, content of the feature configuration template.〗

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a data feature, the method comprising:
issuing a feature configuration template, so that a user configures, on a configuration interface, content of the feature configuration template, wherein the feature configuration template comprises a window feature set, and the window feature set comprises: a data element, a windowing parameter, a statistics type, and a scene element;
receiving a configuration parameter for the data element, a configuration parameter for the statistics type, and a configuration value for the windowing parameter, configured by the user, and receiving a configuration value for the scene element configured by the user;
receiving at least one set of time series data corresponding to the configuration parameter for the data element;
processing the at least one set of time series data based on the configuration value for the windowing parameter, to generate at least one data matrix; and
processing the at least one data matrix based on the configuration parameter for the statistics type, to generate the at least one set of data feature values,
wherein processing the at least one set of time series data based on the configuration value for the windowing parameter to generate at least one data matrix comprises:
performing windowing processing on the at least one set of time series data based on the configuration value for the windowing parameter, to generate at least one window matrix;
performing scene-based processing on the at least one window matrix based on the configuration value for the scene element, to obtain at least one scene matrix corresponding to the at least one window matrix; and
determining a dot product of the at least one window matrix and the at least one scene matrix to generate the at least one data matrix.

2. The method according to claim 1, wherein the windowing parameter comprises: a windowing direction, a windowing size, and a windowing datum point; and
the performing windowing processing on the at least one set of time series data based on the configuration value for the windowing parameter to generate at least one window matrix, comprises:
determining, based on a configuration value for the datum point, a current observation time point of the at least one set of time series data; and
in each set of time series data of the at least one set of time series data, selecting, starting from the current observation time point and in a direction indicated by a configuration value for the windowing direction, time series data indicated by a configuration value for the windowing size to obtain the at least one window matrix.

3. The method according to claim 1, wherein the feature configuration template comprises at least two window feature sets and further comprises at least one transformation feature set comprising a feature transformation rule;
wherein the receiving configuration content configured by the user for the feature configuration template further comprises:
receiving a configuration parameter for the feature transformation rule configured by the user; and
wherein the method further comprises:
processing, based on the configuration parameter for the feature transformation rule, data feature values corresponding to the at least two window feature sets to obtain a transformed data feature value.

4. The method according to claim 1, wherein the method further comprises:
performing formatting processing on the at least one set of time series data according to a preset data recording format.

5. An apparatus for generating a data feature, the apparatus comprising:
one or more processors;
a storage apparatus, storing one or more programs thereon; and
the one or more programs, when executed by the one or more processors, cause the one or more processors to implement operations comprising:
issuing a feature configuration template, so that a user configures, on a configuration interface, content of the feature configuration template, wherein the feature configuration template comprises a window feature set, and the window feature set comprises: a data element, a windowing parameter, a statistics type, and a scene element;
receiving a configuration parameter for the data element, a configuration parameter for the statistics type, and a configuration value for the windowing parameter, configured by the user, and receiving a configuration value for the scene element configured by the user;
receiving at least one set of time series data corresponding to the configuration parameter for the data element;
processing the at least one set of time series data based on the configuration value for the windowing parameter, to generate at least one data matrix; and
processing the at least one data matrix based on the configuration parameter for the statistics type, to generate the at least one set of data feature values,
wherein processing the at least one set of time series data based on the configuration value for the windowing parameter to generate at least one data matrix comprises:
performing windowing processing on the at least one set of time series data based on the configuration value for the windowing parameter, to generate at least one window matrix;
performing scene-based processing on the at least one window matrix based on the configuration value for the scene element, to obtain at least one scene matrix corresponding to the at least one window matrix; and
determining a dot product of the at least one window matrix and the at least one scene matrix to generate the at least one data matrix.

6. The apparatus according to claim 5, wherein the windowing parameter comprises: a windowing direction, a windowing size, and a windowing datum point; and
wherein performing windowing processing on the at least one set of time series data based on the configuration value for the windowing parameter to generate at least one window matrix comprises:
determining, based on a configuration value for the datum point, a current observation time point of the at least one set of time series data; and
in each set of time series data of the at least one set of time series data, selecting, starting from the current observation time point and in a direction indicated by a configuration value for the windowing direction, time series data indicated by a configuration value for the windowing size to obtain the at least one window matrix.

7. The apparatus according to claim 5, wherein the feature configuration template comprises at least two window feature sets and further comprises at least one transformation feature set comprising a feature transformation rule;
wherein the receiving configuration content configured by the user for the feature configuration template further comprises:
receiving a configuration parameter for the feature transformation rule configured by the user; and
the operations further comprise processing, based on the configuration parameter for the feature transformation rule, data feature values corresponding to the at least two window feature sets to obtain a transformed data feature value.

8. The apparatus according to claim 5, wherein the operations further comprise: performing formatting processing on the at least one set of time series data according to a preset data recording format.

9. A non-transitory computer readable medium, storing a computer program thereon, wherein, the program, when executed by a processor, implements operations comprising:
issuing a feature configuration template, so that a user configures, on a configuration interface, content of the feature configuration template, wherein the feature configuration template comprises a window feature set comprising a data element, a windowing parameter, a statistics type, and a scene element;
receiving a configuration parameter for the data element, a configuration parameter for the statistics type, and a configuration value for the windowing parameter, configured by the user, and receiving a configuration value for the scene element configured by the user;
receiving at least one set of time series data corresponding to the configuration parameter for the data element;
processing the at least one set of time series data based on the configuration value for the windowing parameter, to generate at least one data matrix; and
processing the at least one data matrix based on the configuration parameter for the statistics type, to generate the at least one set of data feature values,
wherein processing the at least one set of time series data based on the configuration value for the windowing parameter to generate at least one data matrix comprises:
performing windowing processing on the at least one set of time series data based on the configuration value for the windowing parameter, to generate at least one window matrix;
performing scene-based processing on the at least one window matrix based on the configuration value for the scene element, to obtain at least one scene matrix corresponding to the at least one window matrix; and
determining a dot product of the at least one window matrix and the at least one scene matrix to generate the at least one data matrix.

10. The non-transitory computer readable medium according to claim 9, wherein the windowing parameter comprises: a windowing direction, a windowing size, and a windowing datum point; and
the performing windowing processing on the at least one set of time series data based on the configuration value for the windowing parameter to generate at least one window matrix comprises:
determining, based on a configuration value for the datum point, a current observation time point of the at least one set of time series data; and
in each set of time series data of the at least one set of time series data, selecting, starting from the current observation time point and in a direction indicated by a configuration value for the windowing direction, time series data indicated by a configuration value for the windowing size to obtain the at least one window matrix.

* * * * *